United States Patent [19]

Paleja et al.

[11] Patent Number: 5,686,497
[45] Date of Patent: Nov. 11, 1997

[54] EXPANDABLE BEADS BASED ON A POLYMER OF A VINYLAROMATIC COMPOUND CONTAINING BLOWING AGENT AND PLASTICIZER

[75] Inventors: Rakesh Jaysinh Paleja; Dominique Paul Vliers; Maria Johanna Willems, all of Louvain-La-Neuve, Belgium

[73] Assignee: Shell Oil Company, Houston, Tex.

[21] Appl. No.: 559,522

[22] Filed: Nov. 15, 1995

[30] Foreign Application Priority Data

Nov. 15, 1994 [EP] European Pat. Off. ............... 94203334

[51] Int. Cl.⁶ .................... C08J 9/18; C08J 9/20
[52] U.S. Cl. .................... 521/56; 521/60; 521/146
[58] Field of Search .................... 521/56, 60, 146

[56] References Cited

U.S. PATENT DOCUMENTS 3,303,159  2/1967  Sanders .
4,459,373  7/1984  Mahn et al. ................. 521/56
4,520,135  5/1985  Hahn et al. ................. 521/56
4,525,484  6/1985  Mahn et al. ................. 521/60
5,104,903  4/1992  Hahn et al. ................. 521/56

FOREIGN PATENT DOCUMENTS 0 217 516 A2  4/1987  European Pat. Off. .
0 405 325 A2  1/1991  European Pat. Off. .
56/067343  6/1981  Japan .

Primary Examiner—John M. Cooney, Jr.

[57] ABSTRACT

The present invention relates to expandable beads based on a polymer of a vinylaromatic compound containing a blowing agent and, in an amount of 0.1 up to 2% wt, preferably 0.3 up to 1.5% wt calculated on the beads, of a plasticizer that is based on oligomers of styrene and/or alpha-methylstyrene having a number-average molecular weight ($M_n$) in the range of 200 to 500, preferably of 260 to 460; and a process for preparing these expandable beads.

8 Claims, No Drawings

EXPANDABLE BEADS BASED ON A POLYMER OF A VINYLAROMATIC COMPOUND CONTAINING BLOWING AGENT AND PLASTICIZER

FIELD OF THE INVENTION

The invention relates to expandable beads based on a polymer of a vinylaromatic compound containing a blowing agent and a plasticizer. In other aspects, the present invention relates to a process for preparing these expandable beads, and articles of expanded beads, obtainable by expanding and fusing these beads.

BACKGROUND TO THE INVENTION

Expandable beads such as for instance the range of expandable polystyrene grades sold by Shell Chemical Company under the trademark "STYROCELL", find many different uses. Known applications are in low or medium density block or continuous board mouldings, large boxes and medium density insulating boards, blocks for veneer cutting, higher strength contour mouldings, packages with wall thickness above 10 mm, fish boxes, floor units, etc. Besides the regular grades, also flame retarding grades and special grades are available.

Expandable beads in the market place are mainly judged by three performance criteria; namely expandability, strength (fusion) and dimensional stability in the form of a short pressure-decay time (i.e., the minimum time the foamed article needs to remain in the mould to avoid warping, etc.). Both high ratings for strength (of the moulded article) and expandability (of the expandable beads) are desired. Moreover, it is preferred that articles of satisfactory strength may be prepared by expanding the expandable beads at low steam pressures, for instance of about 0.6 bar gauge. Finally, the pressure-decay time, which affects the overall cycle time, should be as short as possible.

It is known to use a plasticizer, such as for instance white oil or cyclohexane, to improve expansion and strength at low steam pressures. The improvement achievable with white oil, however, is obtained at the detriment of strength. The operating window is thus very small. Moreover, the improvement in strength at lower steam pressures is not very high. The improvement with cyclohexane is better. Unfortunately, cyclohexane is not approved for food contact applications in the European market.

U.S. Pat. Nos. 4,525,484 and 4,459,373 disclose expandable beads based on polystyrene respectively poly-para-methylstyrene that are produced by polymerizing (para-methyl)styrene in aqueous suspension in the presence of blowing agents and of chain transfer agents and/or (para-methyl)styrene oligomers. According to the patent specifications, low densities are attainable at high throughputs without adverse effect on the dimensional stability of the foamed articles when using expandable beads prepared in the presence of from 0.1 to 10% wt of (para-methyl) styrene oligomer having a number-average molecular weight ($M_n$) from 500 to 5,000, preferably 800 to 2,000 that is added at a conversion of from 0 to 90%. The styrene oligomer that is illustrated has an $M_n$ of 1,200 and is employed at a concentration of 1–1.5%. As is shown by Comparative example B set out hereinafter, expandable beads prepared using this styrene oligomer as plasticizer in the disclosed concentration require a (too) long pressure-decay time. Moreover, although some improvement in strength at low steam pressures is found, (further) improvement remains desirable, in particular for expandable beads containing a low amount of blowing agent. Unfortunately, no teaching on strength improvement is provided in any of these US patent specifications.

An object of the present invention is therefore to provide a solution to overcome the draw-backs mentioned above.

SUMMARY OF THE INVENTION

This and other objects are accomplished by expandable beads comprising a polymer of a vinylaromatic compound containing a blowing agent and, in an amount of 0.1 up to 2% wt, preferably 0.3 up to 1.5% wt calculated on the beads, of a plasticizer comprising oligomers of styrene and/or alpha-methylstyrene, the oligomers of styrene and/or alpha-methylstyrene having a number-average molecular weight ($M_n$) in the range of 200 to 500. In another aspect, the present invention is a process for preparing expandable beads comprising the steps of: polymerizing a vinylaromatic monomer in aqueous suspension in the presence of a plasticizer, the plasticizer comprising oligomers of styrene and/or alpha-methylstyrene, the oligomers of styrene and/or alpha-methylstyrene having a number-average molecular weight ($M_n$) in the range of 200 to 500; and adding the blowing agent thereto before, during and/or after the polymerization.

DETAILED DESCRIPTION OF THE INVENTION

The present invention provides expandable beads based on a polymer of a vinylaromatic compound containing a blowing agent and, in an amount of 0.1 up to 2% wt, preferably 0.3 up to 1.5% wt (% wt calculated on the beads), of a plasticizer that is based on oligomers of styrene and/or alpha-methylstyrene having a number-average molecular weight ($M_n$) in the range of 200 to 500, preferably in the range of 260 to 460. (The molecular weights may be determined by Gel Permeation Chromatography).

Preferably, the expandable beads are based on polymers of styrene and/or alpha-methylstyrene, more preferably polystyrene (so-called "EPS"). However, the invention may also be applied using expandable beads that are based on copolymers of styrene and a copolymerizable monomer.

The polymer may be a regular grade polymer, having a weight average molecular weight ($M_w$) in the range of 130,00 to 180,000, but may also be a grade having an $M_w$ in excess of 180,000, say up to 500,000, i.e., a grade often used for high strength applications.

The amount of blowing agent may vary widely. Using volatile (cyclo)hydrocarbons, for instance such as pentane, grades having a relatively low content of blowing agent (containing 3 to 4.9% wt of blowing agent) or having a regular content of blowing agent (containing 5.0 to 12% wt of blowing agent) may be produced. For being commonly used, grades having a regular content of blowing agent are preferred. However, for environmental reasons, grades having a low content of blowing agent are preferred.

The invention also relates to the process for preparing these new expandable beads, by polymerizing the vinylaromatic compound in aqueous suspension in the presence of the plasticizer and adding the blowing agent thereto before, during and/or after the polymerization. Suitably a radical initiator is used. The polymerization may also be initiated thermally, e.g., when styrene is the (co)monomer. Details with respect to the initiator and other process features are well known in the art.

Finally, the invention also relates to articles of expanded beads of a polymer of vinylaromatic compounds, obtainable by expanding and fusing the new expandable beads by heating the same in a mould at a temperature above the boiling point of the blowing agent and the softening point of the polymer. These articles have low density (due to the large expandability of the expandable beads) combined with excellent strength, and may be prepared in relatively short production cycles.

EXAMPLES

The invention will now be further described with reference to the following examples, however, without restricting its scope.

In the examples the following low molecular weight polymers, supplied by Hercules and identified by their trademarks, have been used:

"KRISTALEX" 3115, a water-clear, highly color stable, apolar copolymer having an $M_n$ of respectively 1200, and that is largely derived from alpha-methylstyrene and styrene monomers, and "PICCOLASTIC A5", a viscous liquid mixture of oligomers (trimers and tetramers) of styrene having an $M_n$ of 360.

Besides, GMS, (glycerol mono-stearate) a conventional coating agent whose function it is to prevent agglomeration and static of the expandable beads, is used.

The raw beads so prepared were tumbled in a ribbon blender (a Hermann Linden machine for 1 kg batches, run for 10 minutes) with a coating composition comprising GMS until an uptake of 4 g (0.4% wt) was achieved.

The coated beads were pre-expanded in a batch pre-expander (of the firm Händle) using a steam pressure of 0.20 bar gauge. The pre-foam-density reached after 25 seconds ($D_{25}$) and the steaming time required to achieve a density of about 20 g/l ($t_{20}$) were determined. The pre-expanded beads were allowed to mature overnight in an air-permeable silo and were machine moulded into tiles of 300 mm by 300 mm by 50 mm in a steam-heated enclosed mould operating at 0.6 bar gauge. The maximum foam pressure and the pressure-decay time for each tile were noted. Next, the tiles were dried for two days at 70° C. and then conditioned and tested for cross-breaking strength (at break).

From Table 1 it follows that both "KRISTALEX" 3115 and "PICCOLASTIC A5" improve the expandability as $D_{25}$ and $t_{20}$ are reduced in respect of the reference sample (Comparative example A). "PICCOLASTIC A5", however, is preferred for providing the more acceptable pressure-decay time. Moreover, a good or even better cross-breaking strength at low steam pressures (0.6 bar gauge) is obtained using substantially less plasticizer.

TABLE 1

| EXAMPLE | A | 1 | 2 | 3 | 4 | B[2] |
|---|---|---|---|---|---|---|
| Ingredients | | | | | | |
| AS (%) | — | 0.3 | 0.9 | 1.2 | 2.0 | — |
| 3115 (%) | — | — | — | — | — | 1.5 |
| Pentane in raw beads (% wt) | 6.1 | 6.2 | 6.3 | 6.3 | n.d.[3] | 6.6 |
| Property | | | | | | |
| $D_{25}$ (g/l) | 20.0 | 18.3 | 16.2 | 16.0 | 15.1 | 16.8 |
| $t_{20}$ (sec) | 25.0 | 22.5 | 19.5 | 21.0 | 20.0 | 21.0 |
| Prefoam density (g/l) | 20.0 | 19.9 | 19.6 | 18.5 | 17.8 | 21.0 |
| Cross-breaking strength at 0.6 bar g steam pressure)[1] (N) | 1028 | 1180 | 1170 | 1174 | 1074 | 1158 |
| Pressure-decay time (s) | 117 | 245 | 275 | 244 | 224 | 398 |

[1]corrected to a density of 20 g/l
[2]US-A-4,525,484
[3]not determined, about 6.2% wt The plasticizers have been studied in EPS for their expandability-strength balance with respect to regular grade EPS (having an $M_w$ of about 175,000).

Examples 1 to 4, Comparative Examples A and B

Samples of the regular grade EPS were prepared by polymerization carried out in a bench-scale (9-liter) reactor.

The plasticizer (loading calculated on the sum of styrene monomer and plasticizer) was first mixed with all the styrene at 50° C. for 30 minutes to achieve dissolution. Demineralized water was next poured into the reactor. Thereafter, polymerization was initiated by radicals of di-benzoyl peroxide (BPO) and t-butyl peroxybenzoate (tBP). The concentration of initiators was calculated on the styrene monomer only. Beads of particle size of 0.7–1.2 mm were made using about 0.05% wt, calculated on the total amount of styrene and plasticizer, of bentonite and gelatine stabilizer. The blowing agent, pentane, was dosed during the polymerization reaction. The polymerization time for the regular grade EPS was about 210 minutes at 90° C. to 130° C.

We claim:

1. Expandable beads comprising a polymer of a vinylaromatic compound containing a blowing agent and, in an amount of 0.1 up to 2% wt, calculated on the beads, of a plasticizer comprising oligomers of styrene and/or alpha-methylstyrene, the oligomers of styrene and/or alpha-methylstyrene having a number-average molecular weight ($M_n$) in the range of 260 to 460.

2. The beads of claim 1 wherein the beads comprise polymers of styrene and/or alpha-methylstyrene.

3. The beads of claim 1 wherein the beads comprise polystyrene.

4. The beads of claim 1 wherein the beads are based on a polymer having a weight average molecular weight ($M_w$) in the range of 130,00 to 180,000.

5. The beads of claim 1 wherein the beads comprise a polymer having a weight average molecular weight ($M_w$) in excess of 180,000.

6. The beads of claim 1 wherein the beads contain 5.0 to 12% wt of blowing agent.

7. The beads of claim 1 wherein the expandable beads comprise 3 to 4.9% wt of blowing agent.

8. A process for preparing expandable beads comprising the steps of:

polymerizing a vinylaromatic monomer in aqueous suspension in the presence of a plasticizer, the plasticizer comprising oligomers of styrene and/or alpha-methylstyrene, the oligomers of styrene and/or alpha-methylstyrene having a number-average molecular weight ($M_n$) in the range of 260 to 460; and adding the blowing agent thereto before, during and/or after the polymerization.

* * * * *